United States Patent [19]

Yajima

[11] Patent Number: 4,641,828
[45] Date of Patent: Feb. 10, 1987

[54] METHOD FOR FEEDING MATERIAL SHEET TO A PRESS

[75] Inventor: Toshio Yajima, Hiratsuka, Japan

[73] Assignee: Kabushiki Kaisha Komatsu Seisakusho, Tokyo, Japan

[21] Appl. No.: 815,652

[22] Filed: Dec. 27, 1985

Related U.S. Application Data

[63] Continuation of Ser. No. 535,677, Sep. 26, 1983, abandoned.

[30] Foreign Application Priority Data

Sep. 28, 1982 [JP] Japan .................................. 57-170612
Nov. 22, 1982 [JP] Japan .................................. 57-204957
Feb. 21, 1983 [JP] Japan .................................. 58-27417

[51] Int. Cl.$^4$ .................... B65H 7/14; B65H 9/10; B65H 9/20
[52] U.S. Cl. ................................. 271/227; 271/248; 83/74; 83/367; 83/412
[58] Field of Search ............... 271/227, 228, 232, 248, 271/249; 83/72, 74, 114, 367, 410, 412

[56] References Cited

U.S. PATENT DOCUMENTS 4,143,571 3/1979 Oxenham .............................. 83/412
4,434,693 3/1984 Hosoi et al. ....................... 83/410 X

FOREIGN PATENT DOCUMENTS 122933 9/1980 Japan .
2034025 5/1980 United Kingdom ................ 271/227

Primary Examiner—Bruce H. Stoner, Jr.
Assistant Examiner—Lawrence J. Goffney, Jr.
Attorney, Agent, or Firm—Spensley Horn Jubas & Lubitz

[57] ABSTRACT

A method for feeding material sheet to a press comprises steps of transferring a material sheet on which print parts and the corresponding positioning marks are printed for a preset distance at least until the positioning mark comes into the field of view of a viewing device provided in a position related to the working position of the press, detecting misalignment between the centers of the positioning mark and a reference mark of the field of view in the X and Y axis directions by the viewing device, and positioning the print part at the press working position automatically and precisely by using the detected amount of the misalignment as a correction value for positioning.

25 Claims, 20 Drawing Figures

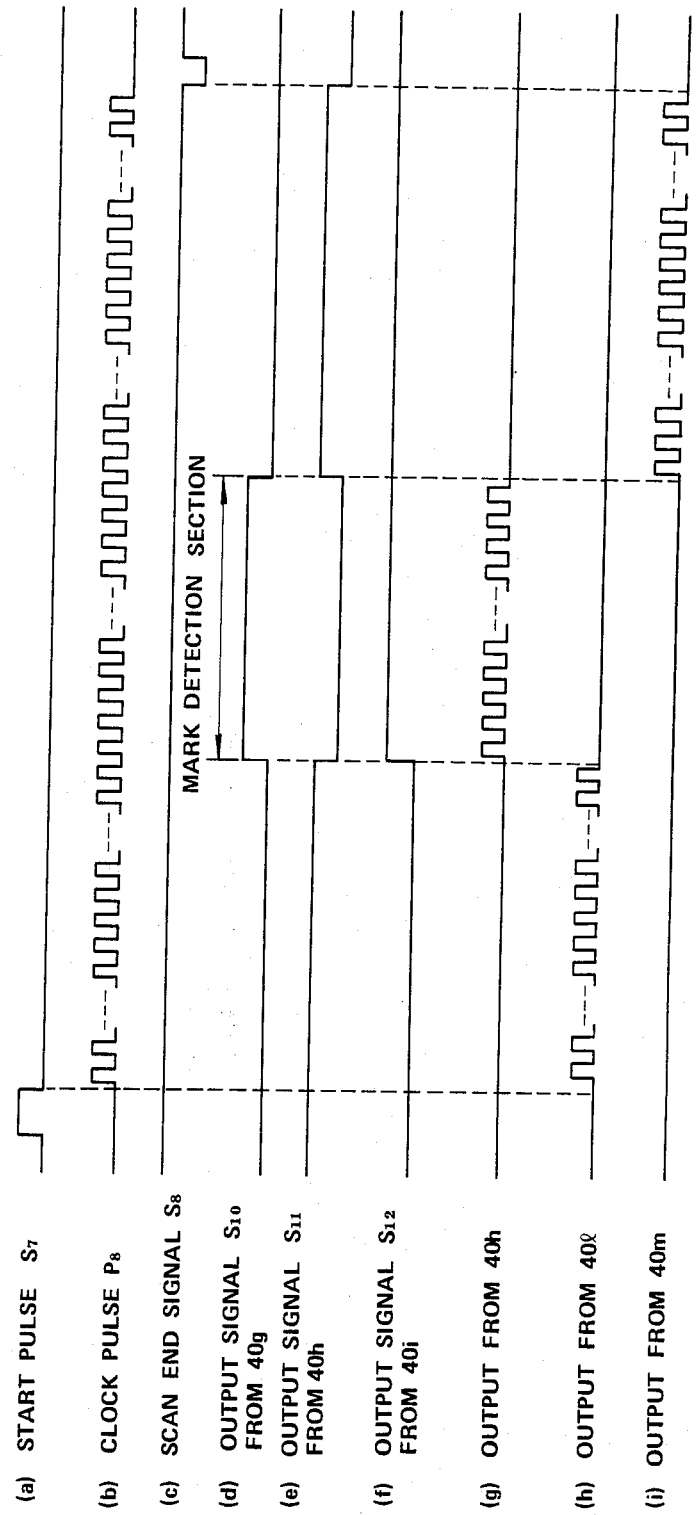

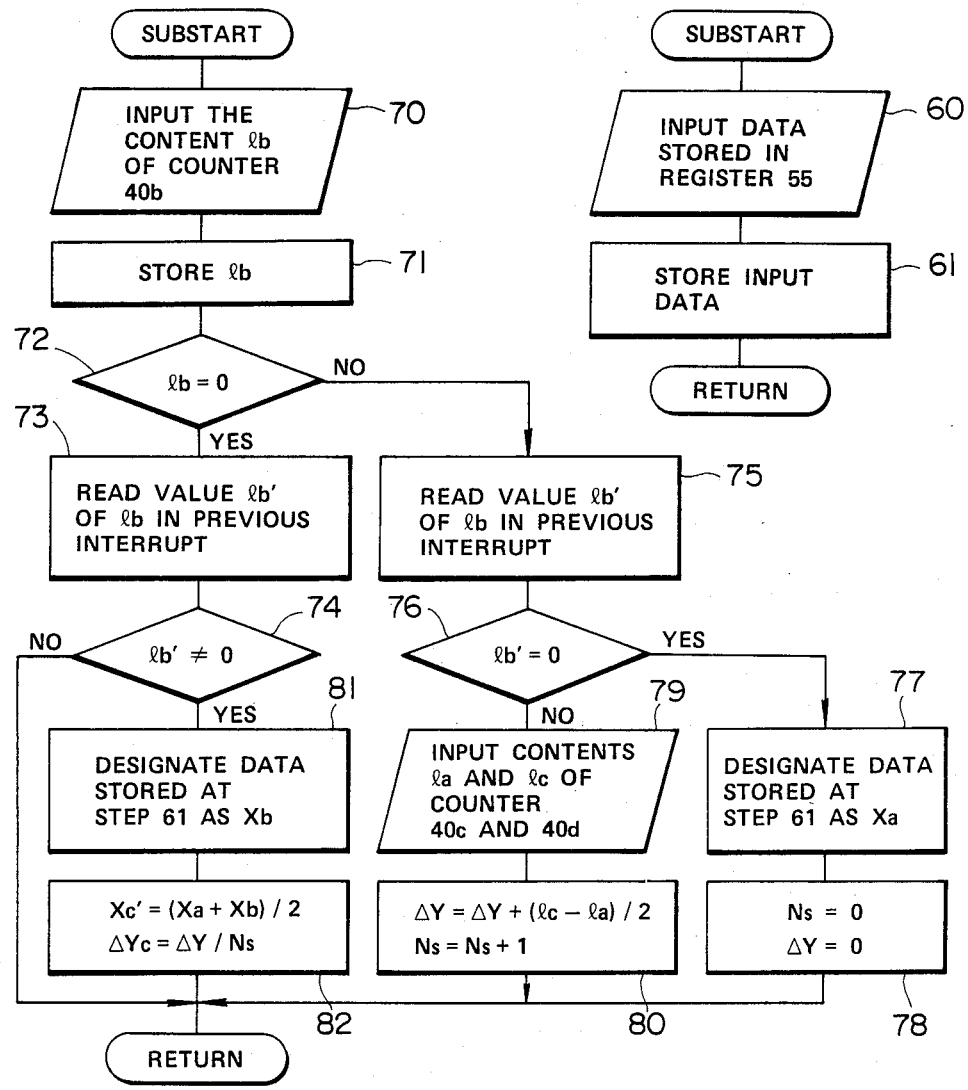

```
                                              93

PUNCHING SKIP

SHEET        ROW         MARK       RJ CODE

C = 3        R = 2       K = 35
   C = 28       R = 5       K = 1
   C = 135      R = 3                    *
     .            .           .          .
     .            .           .          .
     .            .           .          .
```

METHOD FOR FEEDING MATERIAL SHEET TO A PRESS

This application is a continuation of application Ser. No. 535,677 filed Sept. 26, 1983, now abandoned.

BACKGROUND OF THE INVENTION

1. Field of the Invention

The present invention relates to a method for feeding material sheets to be punched to a press.

2. Description of the Prior Art

In prior art, when print parts are punched out from the material sheet 1 by a press, as shown in FIG. 1, the sheet 1 is cut off to several pieces by shears (process I), a guide hole M' is made by a table drill at the point of a mark M on the piece for positioning (process II), a print 1a is positioned by slipping the guide hole M' onto a guide pin 2a of a die 2 of the press (process III), and the print part 1a is punched.

However, such prior art method involves disadvantages such as difficulty to feed the material sheet 1 to the press continuously, and lowering of work efficiency since forming the guide holes requires time and labor.

SUMMARY OF THE INVENTION

The present invention is directed to provide a material sheet feeding method for automatic and precise positioning of each print part of the material sheet to the working position of the press.

According to the present invention, to achieve the above-mentioned object, there are provided the steps of transferring a material sheet on which print parts and the corresponding positioning marks are printed for a preset distance at least until the positioning mark comes into the field of view of a view means provided in a position related to the working position of the press, detecting misalignment between the centers of the positioning mark and a reference mark of the field of view in the X and Y axis directions by the view means, and positioning the print part at the press working position automatically and precisely by using the detected amount of the misalignment as a correction value for positioning.

BRIEF DESCRIPTION OF THE DRAWINGS

In the accompanying drawings:

FIG. 6 is a time chart showing the operation of each part given in FIG. 5;

FIGS. 7 and 8 are flowcharts used for the explanation of operation of the CPU of the control device in FIG. 3;

DESCRIPTION OF THE PREFERRED EMBODIMENT

The present invention will now be described in detail with reference to the accompanying drawings.

Figure 2:
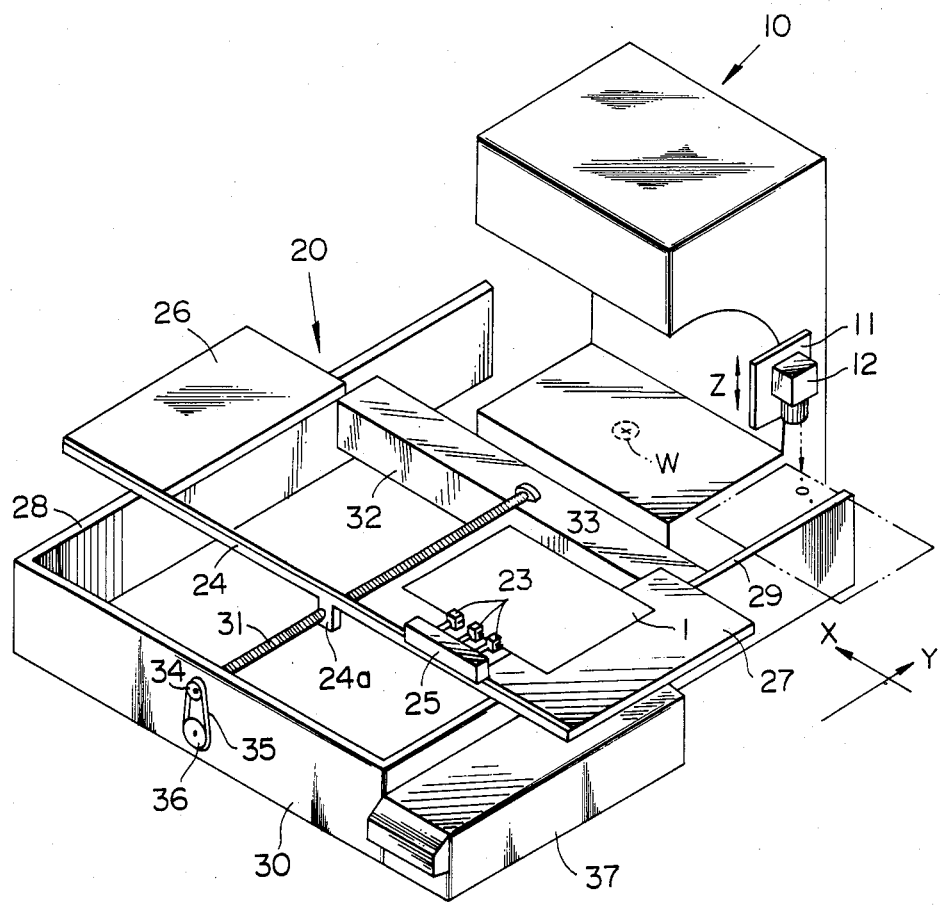
FIG. 2 is a perspective view schematically showing the material sheet feeding device according to the present invention together with a press.

FIG. 2 schematically shows a press 10 and a material sheet feeding device 20 employing the method of the present invention in which a camera 12 is mounted via a seat 11 at a proper place of the frame of the press 10. The camera 12 includes a line image sensor (not shown) disposed along the Y axis direction (arrow Y).

The material sheet feeding device 20 comprises a clamper 23 for holding a material sheet 1, a clamper carrier 25 for moving the clamper 23 over a beam 24 provided in the X axis direction (arrow X), tables 26 and 27 attached to the beam 24 for supporting the material sheet 1, wall members 28 and 29 having rails for guiding the tables 26 and 27 in the Y axis direction and supporting those tables 26 and 27, a wall member 30 for joining the wall members 28 and 29, a transfer shaft 31 screwed to a female screw part 24a attached to the beam 24 for moving the beam 24 and the tables 26 and 27 in the Y axis direction, a bridge member 32 for joining the wall members 28 and 29, a bearing for a drive shaft 31 attached to the bridge member 32, a drive pulley 36 for driving a pulley 34 attached to the drive shaft 31 via a belt 35, and a control unit 37 for performing positioning control. The clamper carrier 25 and the drive pulley 36 are independently driven by separate motors (not shown). As a result, the material sheet 1 can be moved in the X and Y axis directions together with the clamper carrier 25.

Figure 3:
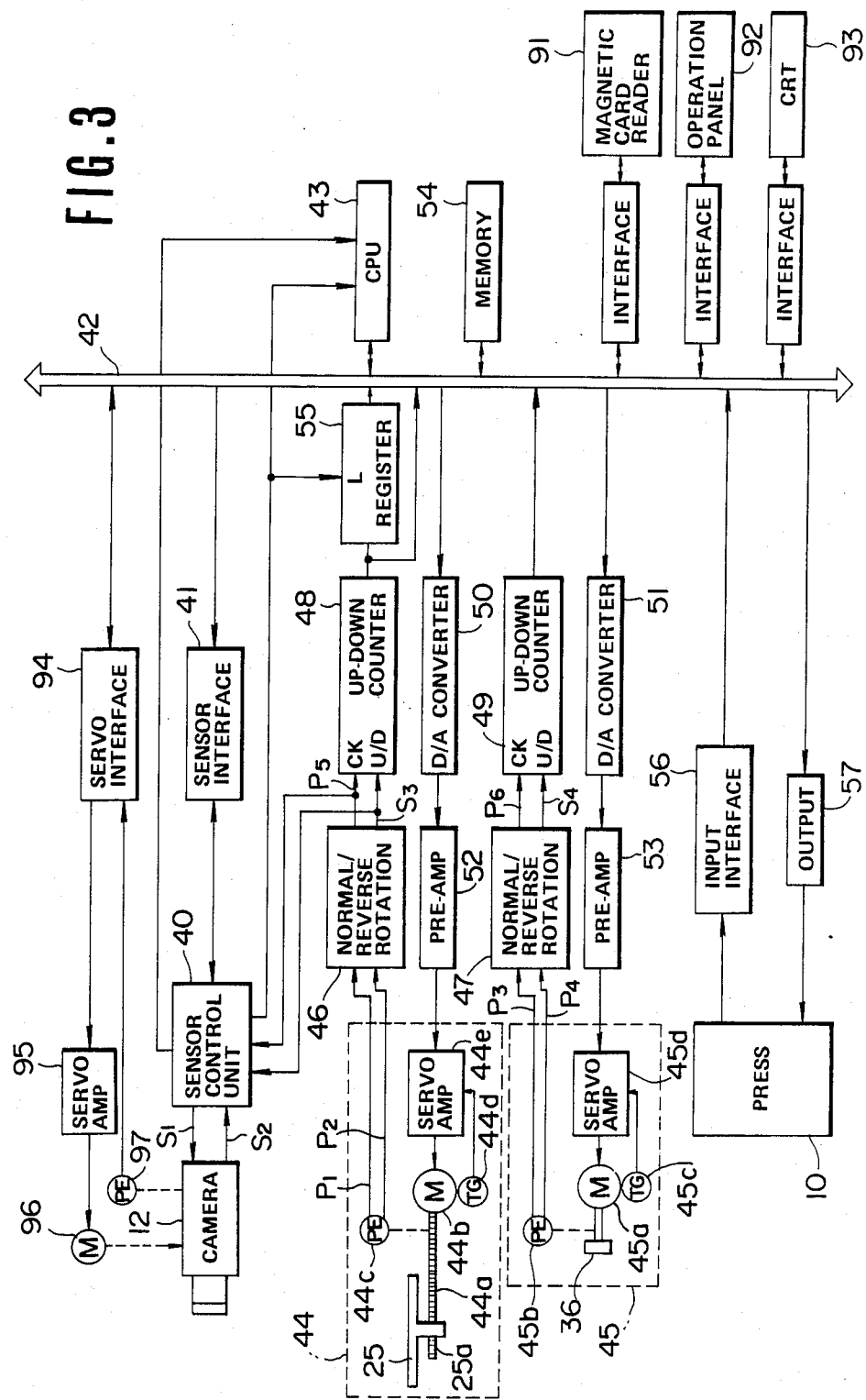
FIG. 3 is a block diagram of an embodiment of a control device for realizing the material sheet feeding method of the present invention.

FIG. 3 shows an embodiment of a control device used for the material sheet feeding system of the present invention, in which a sensor control unit 40 is for outputting a scan command signal S1 to the camera 12 and also for processing an image pick-up signal S2 to be outputted from the camera 12. The output of the sensor control unit 40 is fed to the CPU through a sensor interface 41 and a bus line 42.

An X axis drive unit 44 is for driving the clamper carrier 25, and is comprised of a drive shaft 44a for moving the clamper carrier 25 being screwed to a screw part 25a, a motor 44b for rotating the drive shaft 44a, a pulse encoder 44c for generating two pulse signals P1 and P2 of the same waveforms and different phases by the interlocking action of the drive shaft 44a with the shaft of the pulse encoder 44c, a speed detector 44d attached to the motor 44b for generating a signal proportional to the velocity of rotation of the motor 44b, and servo amplifier 44e for supplying a drive signal to the motor 44b.

A Y shaft drive unit 45 is for driving the beam 24 and tables 26 and 27, and is comprised of a motor 45a for driving drive pulley 36, a pulse encoder 45b for generating two pulse signals P3 and P4 of the same waveforms and different phases the pulse encoder shaft being interlocked with the shaft of the motor 45a, a speed detector 45c for detecting the speed of rotation of the motor 45a, and a servo amplifier 45d for supplying a drive signal to the motor 45.

The speed detector 44d and the servo amplifier 44e form a speed feedback loop, and so do the speed detector 45c and the servo amplifier 45d.

The output pulses of the pulse encoders 44c and 45b are fed to normal/reverse rotation discrimination circuits 46 and 47 respectively. The normal/reverse rotation discrimination circuits 46 and 47 discriminate whether the motors 44 and 45 are running in the normal direction or in the reverse direction based on the phase relationship between the pulse signals P1 and P2 and between the pulse signals P3 and P4 respectively. When the motor is found to be running in the normal direction, signals S3 and S4 of the logic level "H" are output, and move pulse signals P5 and P6 representing respectively that the X axis and the Y axis have moved one step are output respectively each time a given number of the pulse signals P1 (or P2) and the pulse signals P3 (or P4) have entered. The signal S3 and the pulse signal P5 are fed to the control input terminal U/D and the clock input terminal CK, respectively of an up/down counter 48, and the signal S4 and the pulse signal P6 are also fed to the control input terminal U/D and the clock input terminal CK of an up/down counter 49, respectively.

The output signals of the up/down counters 48 and 49 are fed to a CPU 43 via a bus line 42 as an X axis position data and a Y axis position data respectively. The CPU 43 calculates an offset data for each axis based on the X axis position data and the Y axis position data, and outputs this data to the servo amplifiers 44 and 45 through the bus line 42, a digital-analog converters 50 and 51 and preamplifiers 52 and 53.

Figure 1:
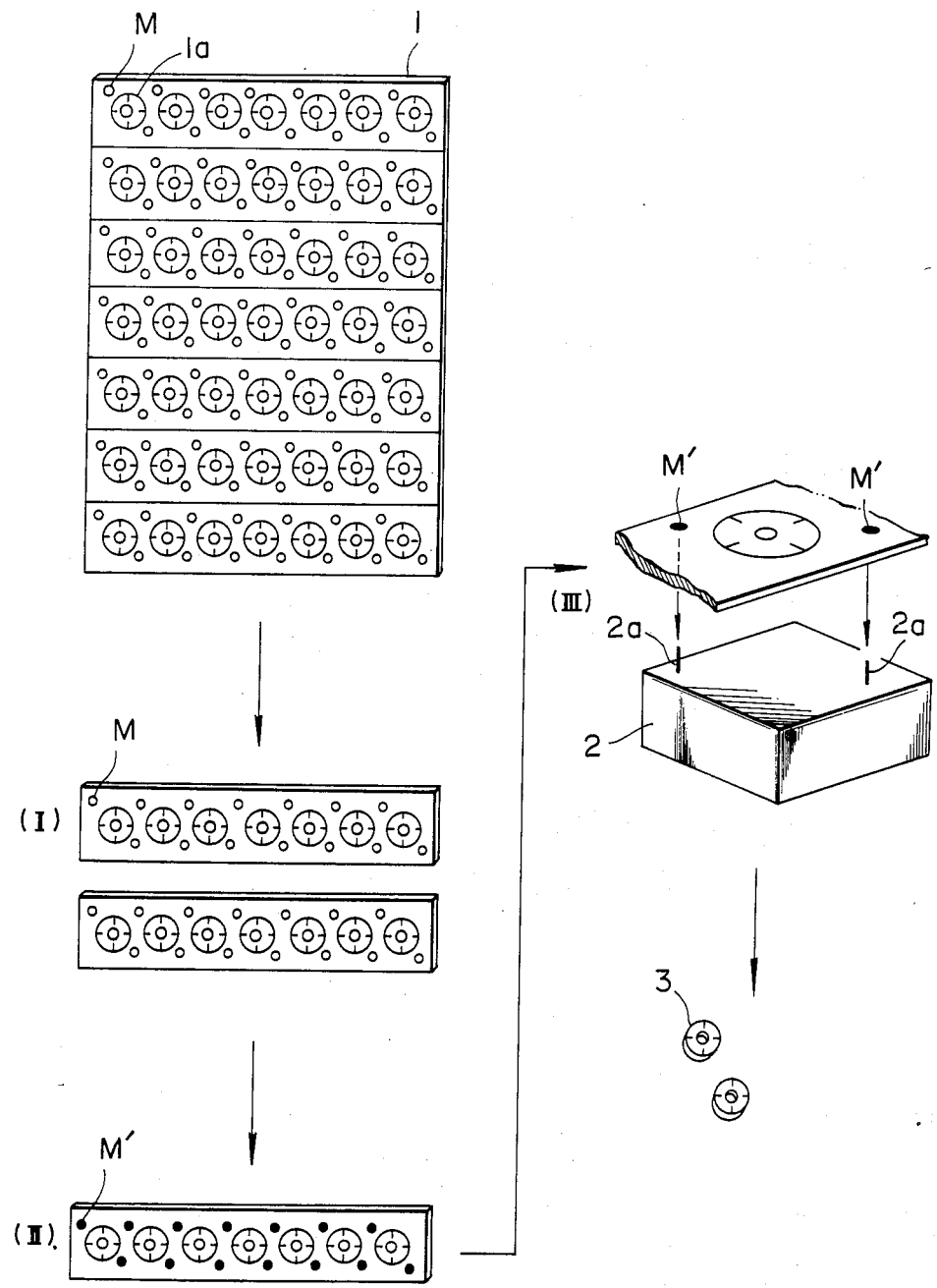
FIG. 1 is a flow diagram showing punching process in a prior art method.

The press 10 produces products such as disks by punching the material sheet 1. As shown in FIG. 1, the material sheet 1 has a circular mark M with a different reflection factor from that of the material sheet 1 near each print part. The position of this mark M, i.e., the position of the mark M in the material sheet feed device 20 shown in FIG. 2, when the material sheet is clamped by the clamper 23 is stored in a memory 54 in advance as an X coordinate and Y coordinate data of the material sheet feed device 20 based on the data such as the pitch between the marks in the X axis direction and the Y axis direction, the mark number, row number, etc. These coordinate data do not indicate a precise center position of the mark due to setting error, print error, etc. of the material sheet 1. Accordingly, the position should be corrected as mentioned later. The center position of the camera 12 and the punching center W of the press are also stored with respect to the above X and Y coordinates.

Figure 4:
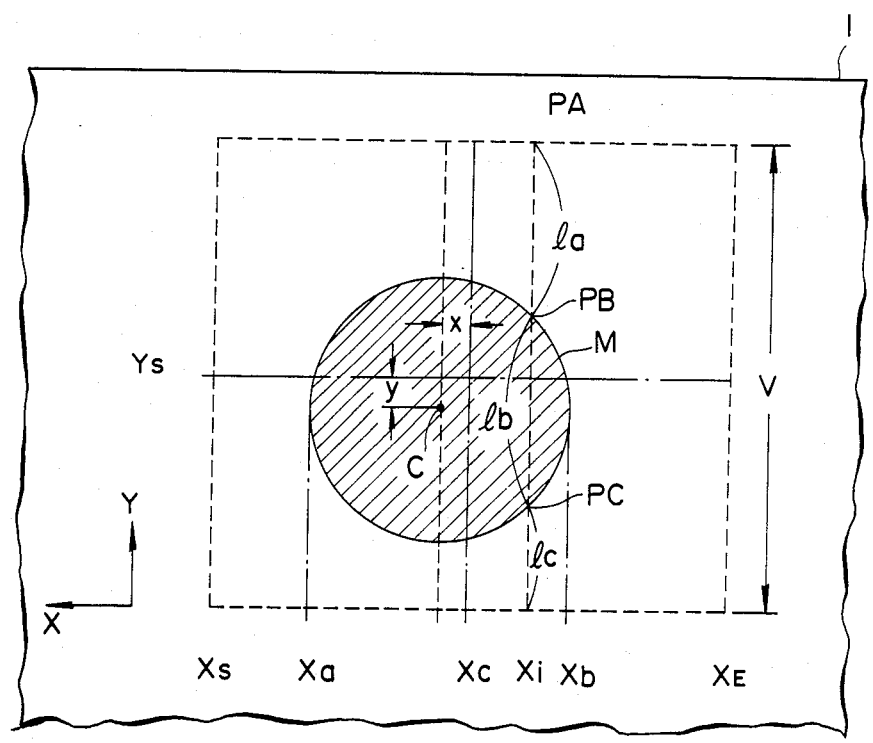
FIG. 4 is a partial plan view of the positioning mark and the surrounding area used for the explanation of the operation of the view means according to the present invention.

In operation, the CPU 43 roughly positions the material sheet 1 based on the coordinate data. Referring to FIG. 4, the line image sensor of the camera 12 photographs a position X on the material sheet 1 with a line length V. Then, the CPU 43 causes the sensor control unit 40 and the X axis drive mechanism 44 to operate, and measures the center position C of the mark M.

Figure 5:
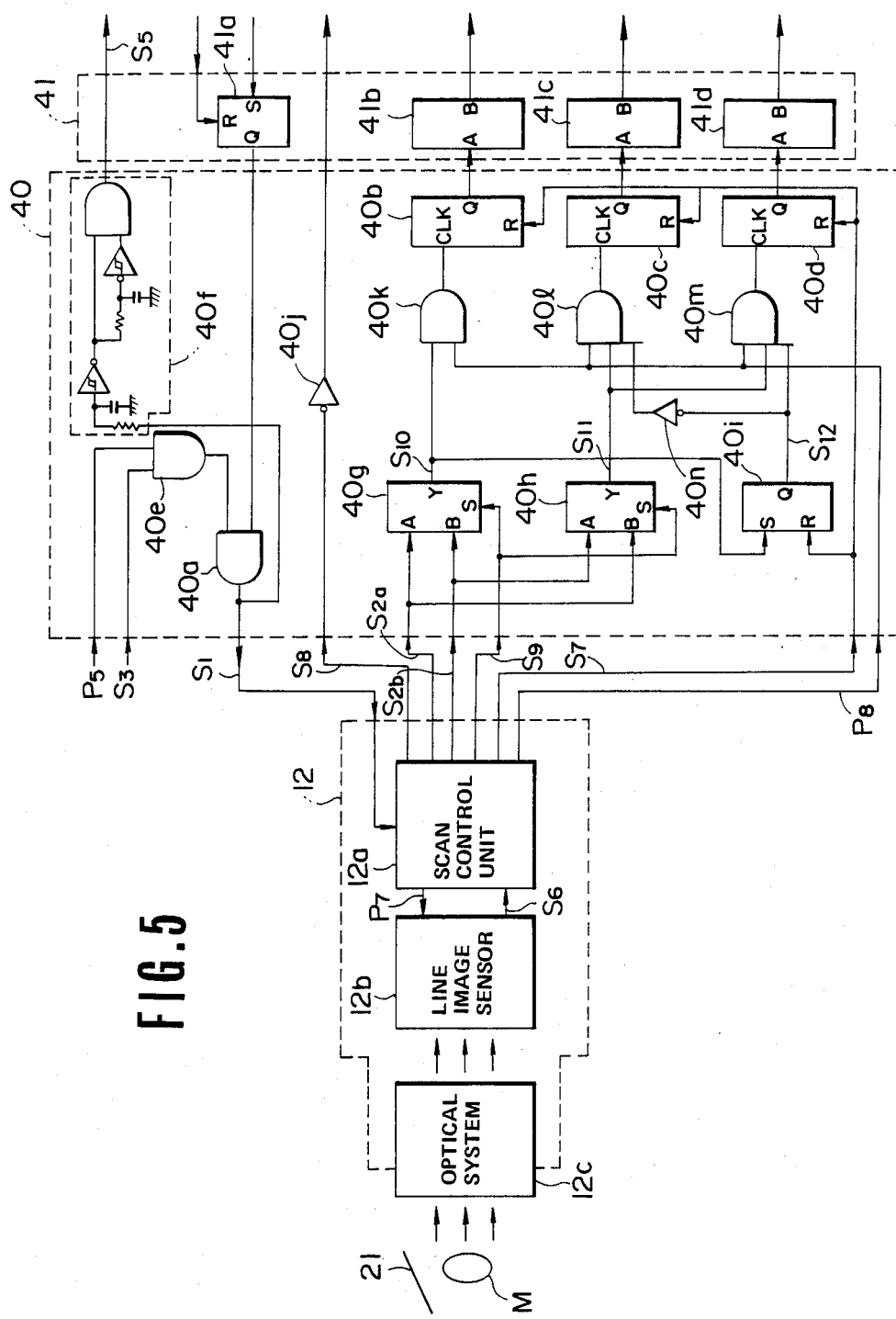
FIG. 5 is a block diagram detailing the main parts of the device shown in FIG. 3.

As shown in FIG. 5, the sensor interface 41 is comprised of a flip-flop 41a, bus buffers 41b, 41c and 41d. The output terminal Q of the flip-flop 41a is connected to one input terminal of an AND circuit 40a in the sensor control unit 40, and the output terminals Q of counters 40b, 40c and 40d are connected to the input terminals A of the bus buffers 41b, 41c and 41d respectively.

The output signal S3 and the pulse signal P5 from the normal/reverse rotation discrimination circuit 46 are fed to respective input terminals of the AND circuit 40e, and the output terminal of the AND circuit 40e is connected to the other input terminal of the AND circuit 40a. The output signal of the AND circuit 40a is fed to a scan control unit 12a of the camera 12 as a scan command signal S1, converted in turn to a signal S5 through a delay waveform shaping circuit 40f, and is fed to a latch command input terminal L of a register 55 and the CPU 43. When a signal S1 is fed, the scan control unit 12a feeds a scan pulse P7 to a line image sensor 12b, and scans light receiving cells of the line image sensor 12b sequentially. Then the scan control unit 12a discriminates whether the image signal S6 outputted from the line image sensor 12b as a result of the scan indicates a bright part or not, and outputs a bright part signal S2b when the signal S6 indicates a bright part and a dark part signal S2a when otherwise, respectively. In addition, the scan control unit 12a outputs a start signal and an end signal at the scan start and at the scan end respectively, and also outputs a clock signal P8 synchronized with the scan of the line image sensor 12b. Furthermore, the scan control unit 12a outputs a signal S9 of the logic level "H" when the reflection factor of the mark M is smaller than that of material sheet 1. An optical system 12c for forming an image on the line image sensor 12b is comprised typically of a combination of lenses.

The signal S2a is fed to the input A of a selector 40g and the input terminal B of a selector 40h, the signal S9 is fed to the respective control input terminals S of the selectors 40g and 40h, the signal S7 is fed to the reset input terminals R of the counter 40b, 40c and 40d and a flip-flop 40i, the signal S8 is fed to the CPU 43 through an inverter 40j, and the clock signal P8 is fed to one input terminal of each of AND circuits 40k, 40l, and 40m. The output signal S10 of the selector 40g is fed to the set input terminal S of the flip-flop 40i and the other input terminal of the AND circuit 40k, and the output signal S11 of the selector 40h is fed to the other input terminals of the AND circuit 40l and 40m respectively. The output signal S12 of the flip-flop 40i is fed to the third input terminal of the AND circuit 40m and also to the third input terminal of AND circuit 40l via an inverter 40n.

Suppose that the reflection factor of the mark M is smaller than that of the material sheet 1 (in the case, for example, when the mark M is delustering black paint), and that the line image sensor 12b is scanning the line whose X coordinate is Xi including the mark M. In such case, the scan control unit 12a turns the logic level of the signal S9 to "L", and as a result the selectors 40g and 40h output signals fed to the respective input terminals B from their output terminals Y.

The flip-flop 41a has already been set by the CPU 43, and therefore a signal S1 is output to the scan control unit 12a corresponding to a signal P5 to be output from the normal/reverse rotation discrimination circuit 46 when the positioning is being performed.

As a result, the scan control unit 12a outputs a start pulse S7 as shown in FIG. 6(a), resets the flip-flop 40i and counters 40b, 40c, and 40d, then outputs a scan pulse P7 to the line image sensor 12b, scans the line from a point PA (FIG. 4), and outputs a clock signal P8 (FIG. 6(b)) synchronized with the scan pulse P7.

On the other hand, the line image sensor 12b outputs a signal S6 representing the bright part during the scanning between a point PA and a point PB and between a point PC and the scan end point, and the dark part during the scan between points PB and PC. Accordingly, the scan control unit 12a outputs a signal S2a whose logic level becomes "H" corresponding to the scan between the points PB and PC, and a signal S2b whose logic level becomes "H" corresponding to the scan between the point PA and PB and between the point PC and the scan end point.

That is, the output signals S10, S11, and S12 of the selectors 40g and 40h, and the flip-flop 40i become as shown in FIGS. 6(d), (e) and (f) respectively. As a result, clock signals to be output from the AND circuits 40k, 40l, and 40m become as shown in FIGS. 6(g), (h) and (i) respectively.

Accordingly, count values of the counters 40b, 40c and 40d become those that indicate the distance lb from the point PB to the point PC (the length of the mark M at the coordinate Xi), the distance la from the scan start point PA to the point PB (the distance from the scan start point to the top of the mark M at the coordinate Xi), and the distance lc from the point PC to the scan end point (the distance between the bottom of the mark M and the scan end point at the coordinate X1), respectively.

At the time when the scan of the line image sensor 12b has finished, a signal $\overline{S8}$ resulted from the inversion of a signal S8 (refer to FIG. 6(c)) acts as a first interrupt signal to the CPU 43.

A signal S5 to be output by the delay wave form shaping circuit 40f is a signal which rises time $\tau$ after the fall time of the signal S1 and maintains the logic level "H" for a given duration of time, and causes the count data (i.e., the X coordinate Xi at that time) of the up-/down counter 48 to be stored in the register 55. The signal S5 also acts as a second interrupt signal to the CPU 43, thereby the CPU 43, as shown in FIG. 7, inputs the storage data of the register 55 (step 60) and stores it in a memory 54 (step 61), and returns to the original processing.

When the reflection factor of the mark M is higher than that of the material sheet 1, the logic level of the signal S9 is caused to be "H". Subsequently, processing similar to the above is performed.

Each time the first interrupt signal $\overline{S8}$ is fed, the CPU 43 performs the control shown in FIG. 8, and detects the center position of the mark M.

That is, firstly the content, i.e., the distance lb, of the counter 40b is fed (step 70), and this data is stored in a given area of the memory 54 (step 71). Since the mark M is not present in the area from the scan start position Xs to the coordinate Xa, the distance lb is zero. Accordingly, the result of judgment at step 72 to determine whether or not the value of the distance lb is zero becomes YES. Then, step 73 is executed, and the content of the counter 40b, i.e., the value of distance lb', stored in the previous interruption is read out. Since the value of the distance lb' is also zero, the result of judgment at step 74 to determine whether or not the value of distance lb' is zero becomes NO. Then, the CPU returns to the processing of the main which had been being executed before the interruption took place.

At the coordinate Xa which corresponds to the left end of the mark M, since the distance lb is not zero, the result of the judgment at step 72 is NO. Further, since the distance lb' read out in step 75 which is of the same content as the step 73 is zero, the result of judgment at step 76 to determine whether the distance lb' is zero or not is YES. Accordingly, the CPU 43 stores the data memorized at the step 61, i.e., the data stored in the register 55, in the memory 54 as the coordinate Xa (step 77), resets variables Ns and $\Delta Y$ by substituting zero for these variables (step 78), and then returns to the processing of the main.

In the area where the mark M is present, since the distances lb and lb' are not zero, the result of the judgment at step 72 is NO, and the result of the judgment at step 76 is NO. Accordingly, the contents of the counters 40c and 40d, i.e., the data of distances la and lc, are input (step 79), the value of $\Delta Y$ is updated, and the value of the variable Ns is inclemented by 1 according to the following equation (1).

$$\Delta Y = \Delta Y + \frac{lc - la}{2} \tag{1}$$

Then, the CPU 43 returns to the processing of the main.

At the coordinate Xb which indicates the opposite end of the coordinate Xa of the mark M, since the value of the distance lb is zero and the value of the distance lb' is not zero, the result of the judgment at step 72 is YES, and the result of the judgment at step 74 is also YES. Accordingly, the CPU 43 reads out the data stored in the register 55 at the step 61, stores the data in the memory 54 as the coordinate Xb (step 81), calculates offsets $\Delta Xc$ and $\Delta Yc$ of the center position of the mark M on the corrdinates X and Y based on the following equations (2) and (3), and memorizes $\Delta Xc$ and $\Delta Yc$ (step 82)

$$\Delta Xc = \frac{Xa + Xb}{2} - Xc \tag{2}$$

$$\Delta Yc = \frac{\Delta Y}{Ns} \tag{3}$$

Then, the CPU 43 returns to the processing of the main.

For the area between the coordinate Xb and the coordinate Xe which is the end point of the scanning description is omitted since the same processing as the area between the corrdinates Xs and Xa is performed.

Based on $\Delta Xc$ and $\Delta Yc$ thus obtained, the CPU 43 corrects the position of the mark M stored in the memory 54. By conducting positioning based on the corrected position coordinates, the CPU 43 can set the print part of the material sheet to the punching center W of the press accurately.

In addition, the CPU 43 performs the positioning control for the material sheet 1 synchronized with the operation of the press 10 based on a crank angle rotation data given from the press 10 through an input interface 56 and the bus line 42. The CPU 43 also stops the press 10 so that the crank positions at the top dead center, outputting a TDC stop command data to the press 10 through the bus line 42 and an output interface 57. Mark positions and the program for operating the CPU 43 are stored in the memory 54 using a magnetic card reader 91 or an operation panel 92.

Now, the focusing of the camera 12 will be explained.

Since the camera 12 performs the detection of the center position of the positioning mark by the resolution of 25 $\mu$m/bit, close-up picturing is ncessary. In this case, the depth of focus is as shallow as around $\pm 1$ mm. Accordingly, focusing should be performed according to the thickness of the material sheet.

When the material sheet is changed, the data representing the thickness of the sheet is set at the operation panel 92 (FIG. 3), and the data is stored in the memory 54. Then, the thickness data is read out by the command from the operation panel 92, and is fed to a Z-axis servo system comprised of a servo interface 94, a servo amplifier 95, a motor 96 and a position detector 97. By the Z axis servo system, the camera 12 is moved and controlled in the Z axis direction on a holder 11 (FIG. 2), and focuses on the surface of the material sheet.

Now, the control for preventing punching error will be described.

Figure 9:
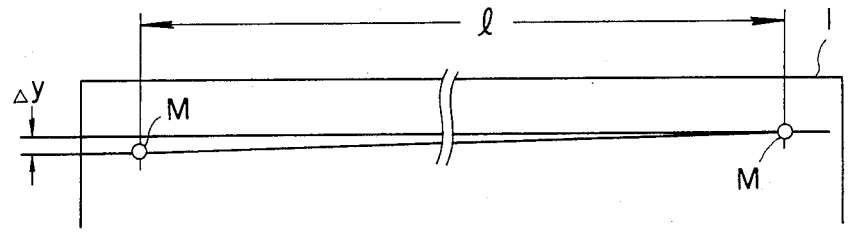
FIGS. 9 and 10 are plan views of a part of the material sheet used for the explanation of punching error due to print error in the material sheet.
Figure 10:
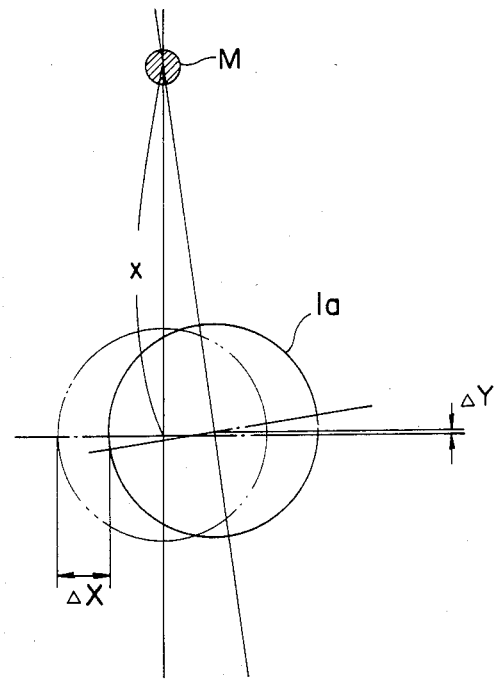
Figure 11:
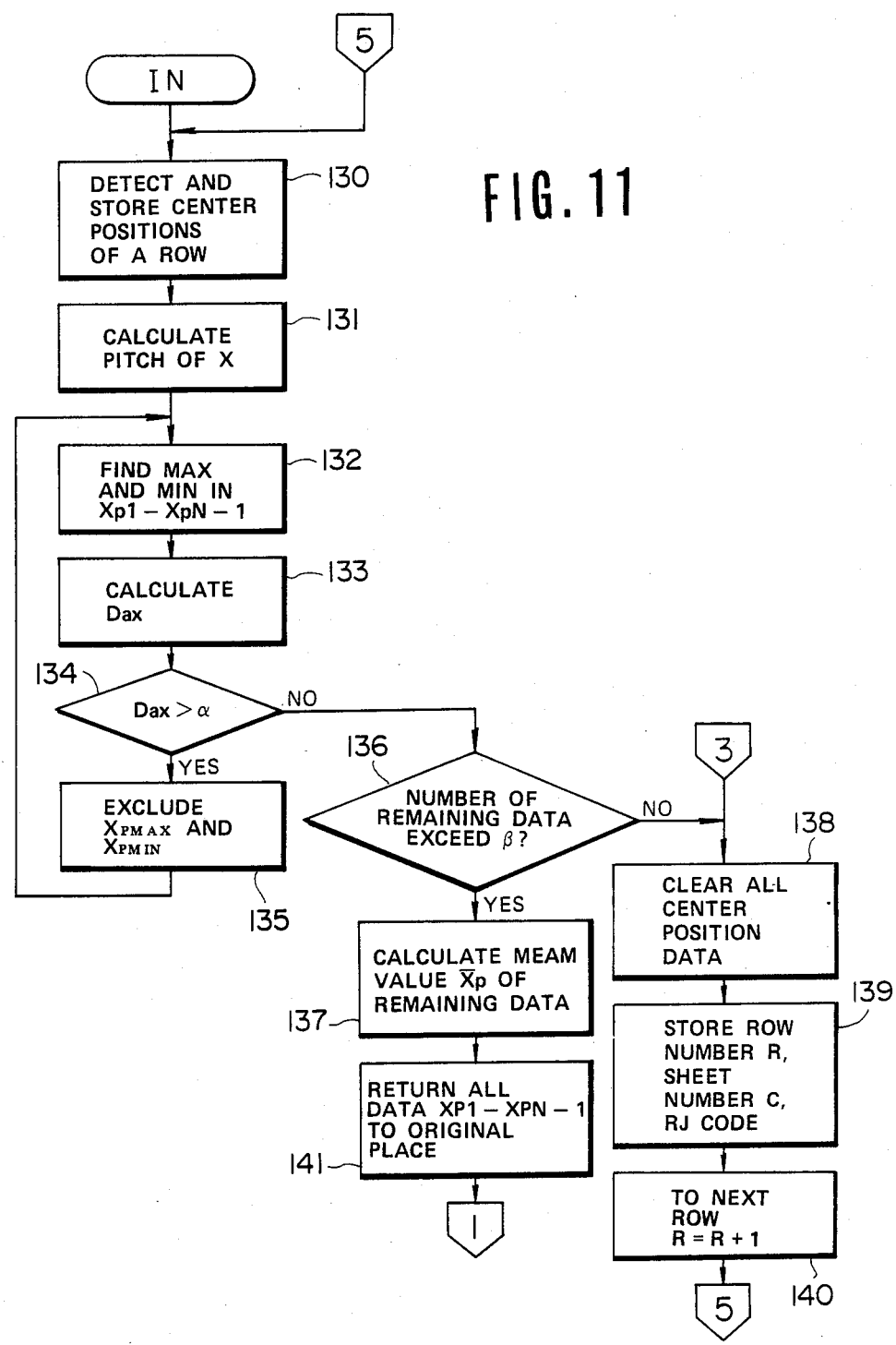
FIGS. 11 through 14 are flowcharts used for the explanation of the operation of the CPU.

The punching errors are likely to arise when clamping of the material sheet is tilted and the print mark is not in normal position. For example, when the center position of the mark M on the material sheet 1 deviates in the Y axis direction by $\Delta y$ as shown in FIG. 9, the print part 1a (FIG. 10) shifts from the position indicated by a broken circle to the position shown by a solid circle as shown in FIG. 10. Now, let the distance between the marks M at both ends be l, the distance between the mark M and the center of the print part 1a be x, the punching error in the X axis direction by $\Delta X$, and the punching error in the Y axis direction be $\Delta Y$, then from the relation between FIGS. 9 and 10, the following equation is established.

$$l : \Delta y = x : \Delta X \quad (4)$$

The equation (4) can be rewritten as follows regarding $\Delta X$.

$$\Delta X = \frac{\Delta y \cdot x}{l} \quad (4)'$$

When l=1000 mm, x=25 mm, and $\Delta y$=1 mm, $\Delta X$=25 $\mu$m is obtained from the equation (4)'. That is, even if the center position of the mark M is detected accurately, and 25 $\mu$m punching error occurs in the X axis direction at a point spaced 25 mm from the center of the mark M.

Figure 15:
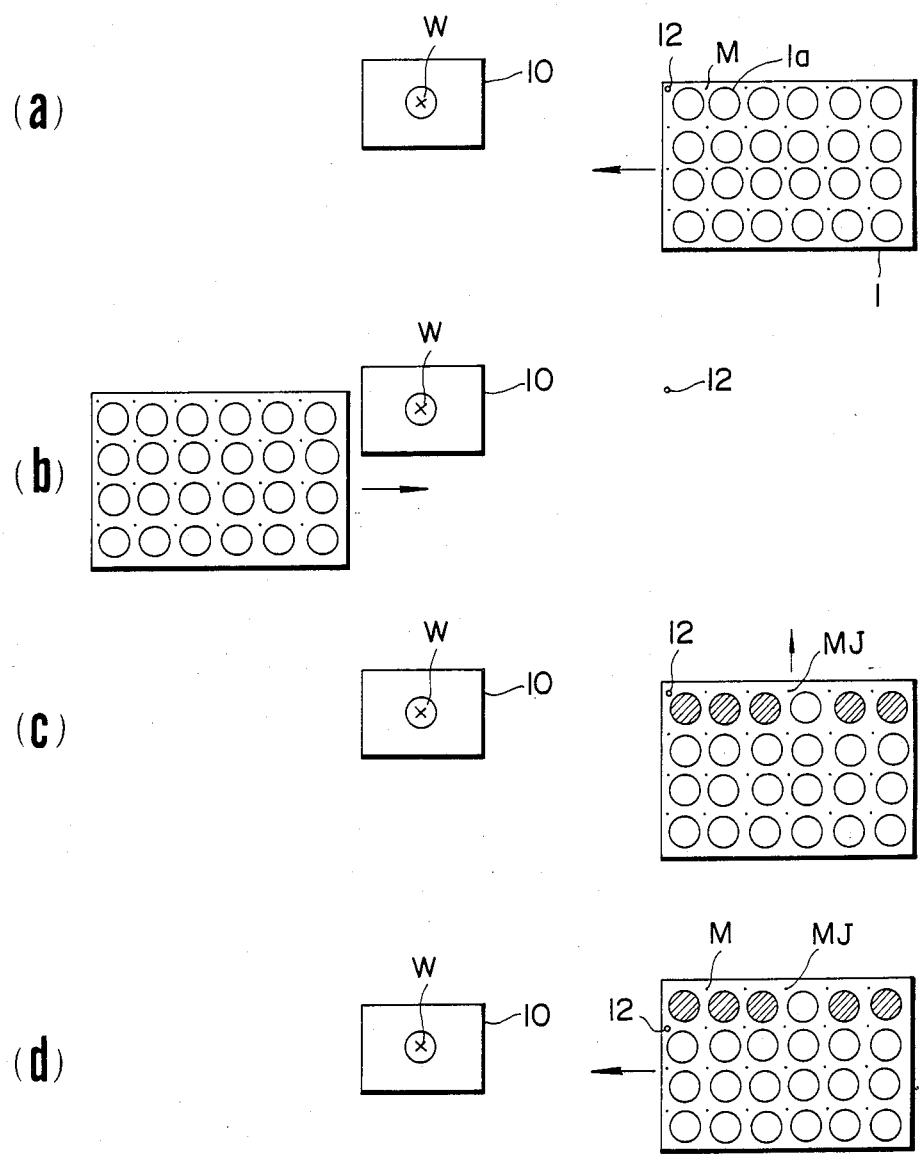
FIGS. 15(a) through 15(d) are drawings showing a typical feed sequence of the material sheet.

FIG. 11 through FIG. 14 are flowcharts of the operation to be performed by the CPU 43 for solving the problem described above. Firstly, the center positions of the marks M of the first row are detected and memorized (step 130). In this case, while moving the material sheet 1 in the X axis direction as shown in FIG. 15(a), the center position coordinates;

$$(X_1, Y_1), (X_2, Y_2), \ldots, (X_N, Y_N)$$

of the marks M, say, as many as N, of the first row are detected by the aforementioned method employing the camera 12, and the center position coordinates of each detected mark M is memorized. Then, the distance between the adjoining marks M in the X axis direction (pitch of X);

$$Xp_1 = X_2 - X_1, Xp_2 = X_3 - X_2, \ldots,$$
$$Xp_{N-1} = X_N - X_{N-1}$$

is calculated (step 131), and the maximum pitch $Xp_{MAX}$ and the minimum pitch $Xp_{MIN}$ are found from among the pitches of X ($Xp_1, \ldots, Xp_{N-1}$) (step 132).

Then, the difference between the maximum pitch and the minimum pitch $Dax$ ($= Xp_{MAX} - Xp_{MIN}$) is calculated (step 133). When Dax is larger than a predetermined allowable limit $\alpha$, the maximum pitch $Xp_{MAX}$ and the minimum pitch $Xp_{MIN}$ are excluded from the pitches of X ($Xp_1, \ldots, Xp_{N-1}$) (step 135), processing is returned to step 132 again, and the sequence is proceeded to the next judgment at step 136 when Dax is smaller than the allowable limit $\alpha$ (step 134). When the sequence is returned to step 135, the maximum pitch $Xp_{MAX}$ and the minimum pitch $Xp_{MIN}$ are excluded, and the maximum pitch $Xp_{MAX}$ and the minimum pitch $Xp_{MIN}$ are found from the remaining data.

In judgment at step 136, when the number of remaining data is larger than a predetermined value $\beta$, judgment is made that the variation among the marks M in the X direction is small and the sequence is proceeded to step 137, and when smaller than $\beta$ the sequence is proceeded to steps 138, 139, and 140 for skipping the punching of the whole row. At step 138, all center position data of the marks M stored at step 130 are cleared, at step 139 row numbers R of all of the cleared center position data, the sheet number C and the RJ code indicating that the whole row should be skipped are memorized, and at step 140 the next row is designated and the sequence is returned to the step 130. The row number R, the sheet number C, and the RJ code memorized at step 139 are used for the positioning later mentioned.

At step 137, the mean value $\overline{X}p$ of the remaining data is calculated by the following equation.

$$\overline{X}p = \frac{\text{sum of remaining data}}{\text{number of remaining data}} \quad (5)$$

At step 141, if there is any data that was excluded at step 135, such data is returned to the original place to store all pitches ($Xp_1$ to $Xp_{N-1}$).

Figure 12:
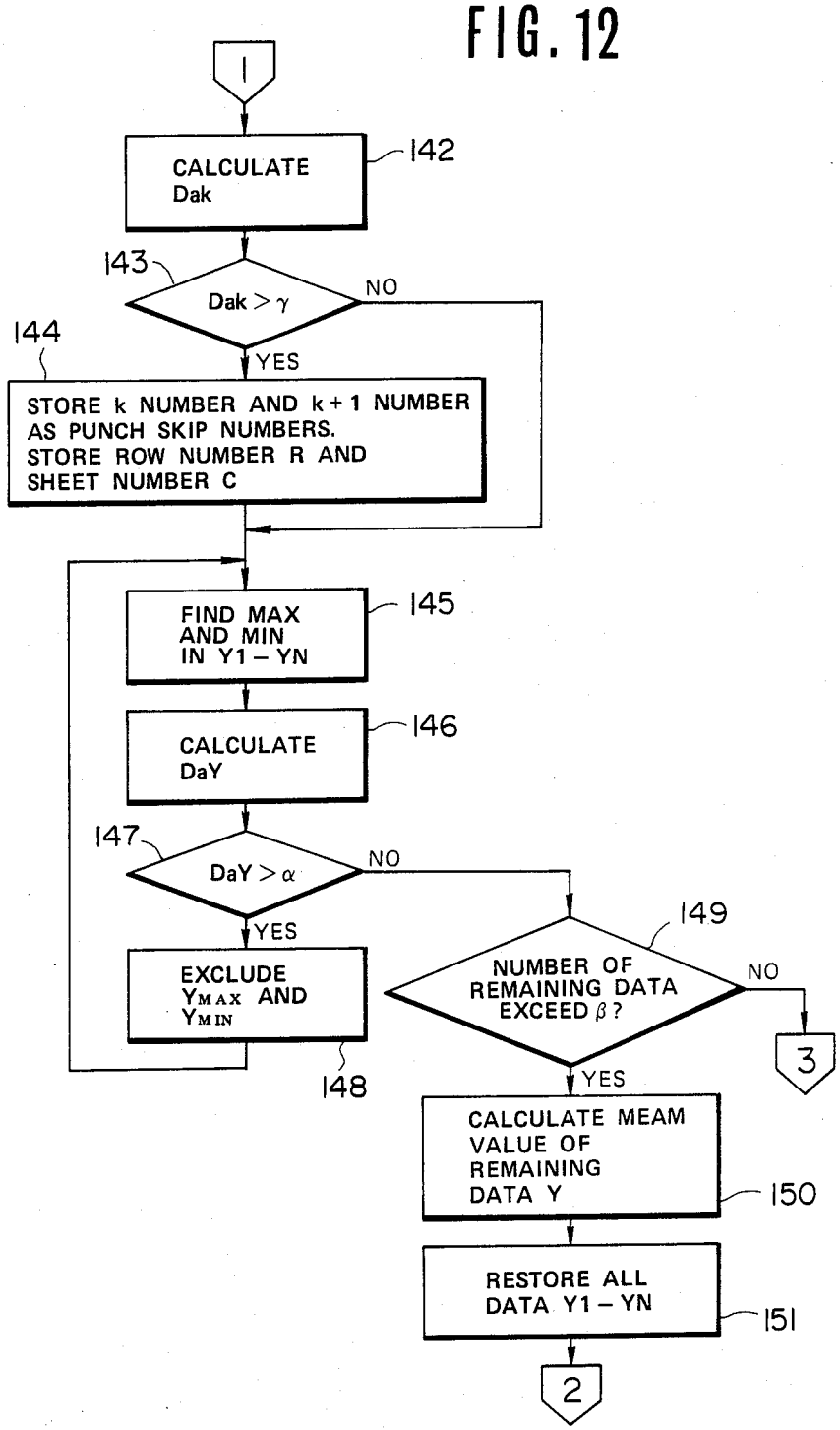

Then, as shown in FIG. 12, the difference $Dak$ ($= |\overline{X}pK - Xp|$) between each pitch and the mean value $\overline{X}p$ calculated at step 137 is calculated (step 142). When the difference Dak is larger than a predetermined allowable limit value $\gamma$ at Xpk, the numbers k and k+1 are memorized as punching skip number together with the row number R and sheet number C at step 144. When the difference Dak is smaller than the allowable limit value $\gamma$, those data are not memorized (step 143). At steps 142 to 144, aforementioned processing and judgment repeatedly are performed from k=1 to N−1.

In the processings so far been described, when the variation among the distances (pitch) between the centers of the adjoining marks in the X axis direction is large in a certain row as a whole, such row is memorized to skip the punching of that whole row. When the variation among the pitchs is not large in the row as a whole, variation of each pitch from the average pitch of the row is examined, and the mark number is memorized so as to skip the punching of the mark associated with the pitch of a large variation.

In the similar manner, the variation in the mark center position in the Y axis direction is examined.

Firstly, the maximum value $Y_{MAX}$ and the minimum value $Y_{MIN}$ are found from among Y coordinates ($Y_1$ to $Y_N$) of mark center positions (step 145). The difference $DaY$ ($= Y_{MAX} - Y_{MIN}$) between the maximum value and the minimum value is calculated (step 146). When the difference DaY is larger than a predetermined allowable limit value $\alpha$, the maximum value $Y_{MAX}$ and the minimum value $Y_{MIN}$ are excluded from among Y coordinates ($Y_1$ to $Y_N$) of the mark center positions (step), and the sequence is returned to step 145 again. When the difference DaY is smaller than the allowable limit value α, the sequence is proceeded to step 149 (step 147).

In judgment at step 149, when the number of the remaining data is larger than a predetermined value β, the variation of the mark M in the Y direction is judged small, and the sequence is proceeded to the next step 150. When the number of the remaining data is smaller than the value β, the variation of the mark M in the Y axis direction is judged large, and the sequence is proceeded to steps 138, 139, and 140 to skip punching of the whole row.

At step 150, the mean value $\overline{Y}$ of the remaining data is calculated by the following equation.

$$\overline{Y} = \frac{\text{sum of remaining data}}{\text{number of remaining data}} \quad (6)$$

At step 151, if there is any data excluded at step 148, the data is restored and stored at Y coordinate ($Y_1$ to $Y_N$).

Figure 13:
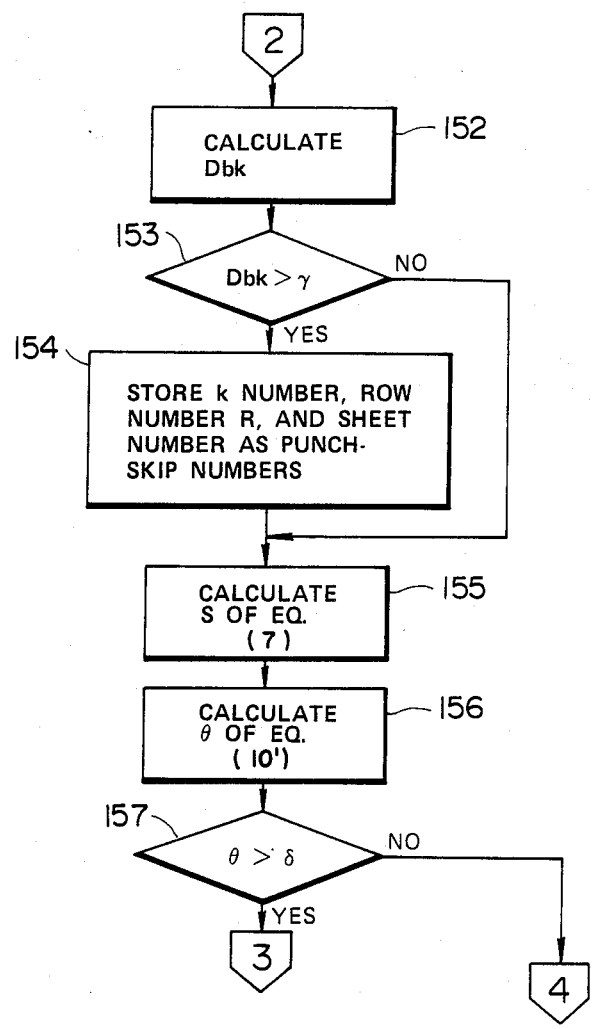
Figure 14:
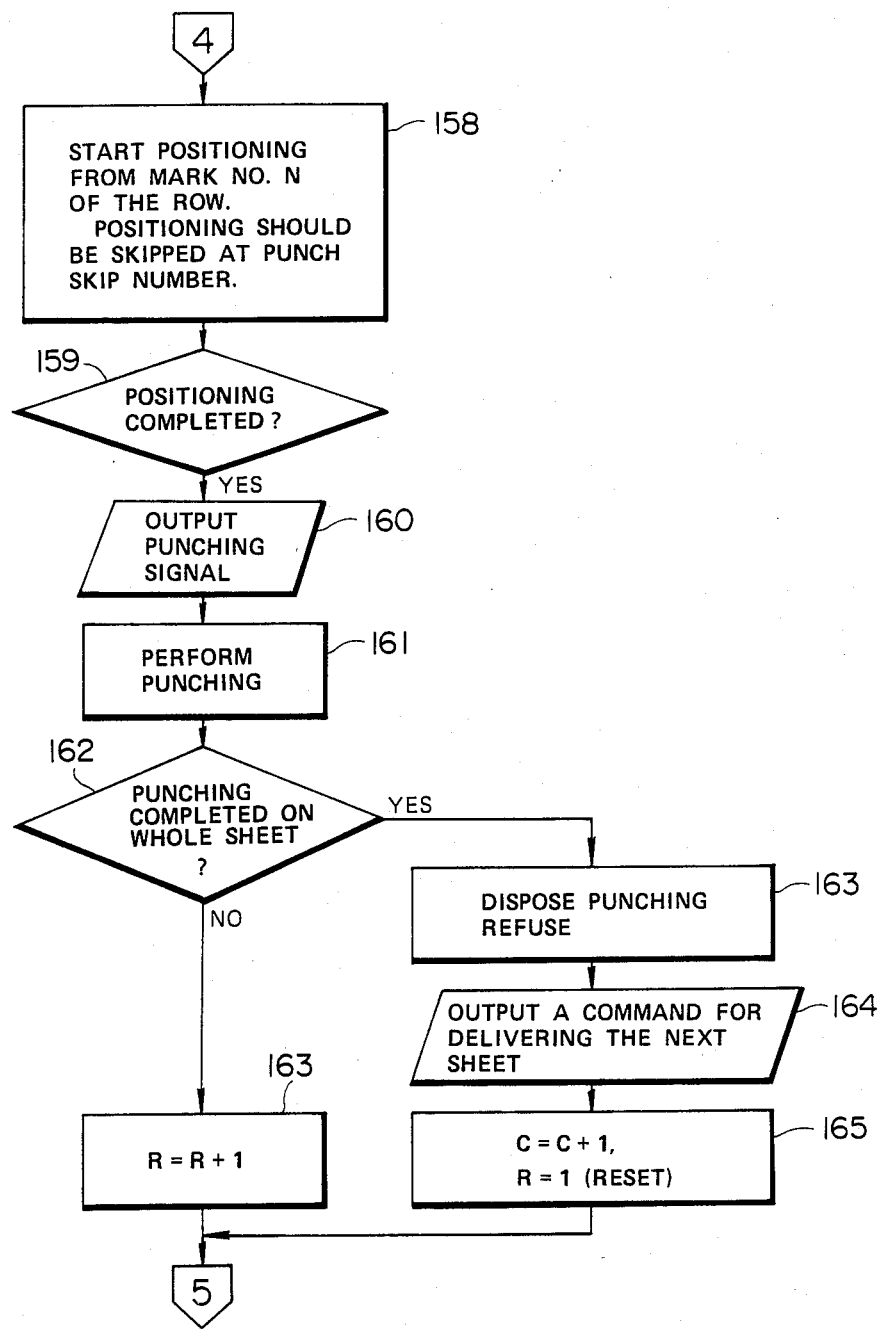

Then, as shown in FIG. 13, the difference $Dbk$ ($= |\overline{Y_k} - \overline{Y}|$) between each Y coordinate and the mean value $\overline{Y}$ is claculated (step 152). When the difference Dbk is larger than a predetermined allowable limit value γ, k number indicating the mark of the Y coordinate, row number R to which k number belongs, and plate number C are memorized at step 154. When the difference Dbk is smaller than the allowable limit value γ, those data are not memorized (step 153). At steps 152 and 153, the above-mentioned processing and judgment are repeatedly performed from k=1 to N−1.

By the processings described above, it is designed that when the variation of Y coordinate of the detection mark center position is large in a certain row, such row is memorized so as to skip the punching of the whole row, while when the variation of Y coordinate is not large, the variation of each Y coordinate from the average value of that row is examined, and the mark numbers which largely deviate from the average value are memorized so as to skip the punching of these marks.

Then, the inclination of the mark and print printed on the material sheet with respect to the press is examined.

Figures 16, 17:
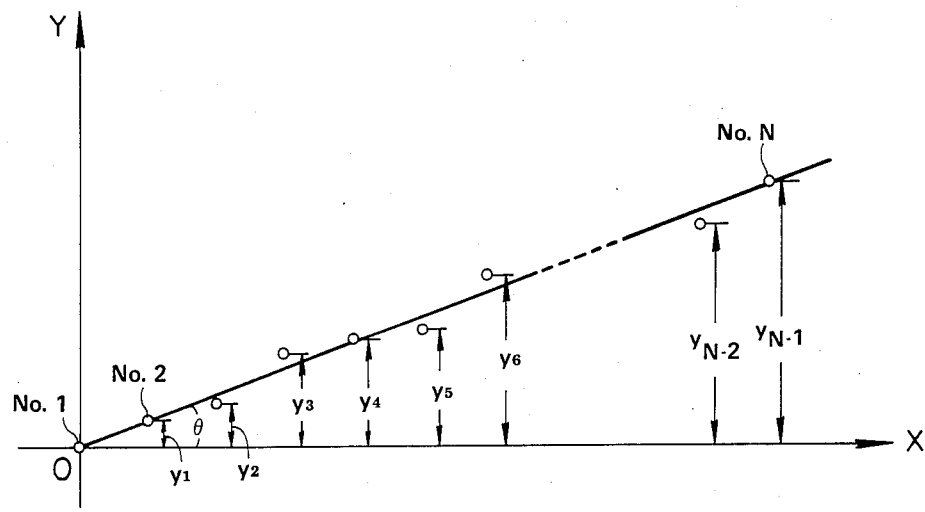
FIG. 16 is a diagram used for the explanation of the method for detecting the inclination of printing with respect to the press.
FIG. 17 is a front view or the CRT display displaying defective parts.

Referring to FIG. 16, Y coordinates of the marks in a row from the second to the Nth are represented as $y_1$, $y_2 \ldots , y_{n-1}$. Then the sum S of these is expressed as follows:

$$S = y_1 + y_2 + \ldots + y_{N-1} \quad (7)$$

If these marks are all on a straight line at an angle θ, the following equation is established.

$$y_1 = Xp \tan\theta \quad (8)$$
$$y_2 = Xp \tan\theta$$
$$\vdots$$
$$y_{n-1} = (N-1)Xp \tan\theta$$

where Xp is the pitch in the X axis direction.

Summing the left sides and the right sides of equation (8), $$y_1 + y_2 + \ldots + y_{N-1} = \quad (9)$$

-continued
$$\{1 + 2 + \ldots + (N-1)\}Xp \tan\theta = \frac{N(N-1)}{2} Xp \tan\theta$$

The angle θ can be found from equations (7) and (9) as follows.

$$\tan\theta = \frac{2S}{N(N-1)Xp} \quad (10)$$

$$\text{Therefore, } \theta = \tan^{-1}\left(\frac{2S}{N(N-1)Xp}\right) \quad (10')$$

Although the sum S contains error due to variation of each mark, the variation of each mark in the value of angle θ obtained by Equation (10') is averaged. When the angle θ is larger than a predetermined allowable limit value δ, the inclination will be taken as large.

The above description will be explained according to the flowchart given in FIG. 13. Firstly, at step 155, the sum S is calculated as follows:

$$S = \sum_{K=1}^{N-1} y_k$$

where $y_k = Y_{k+1} - Y_1$. Then, at step 156, the angle is calculated. Here, for Xp in Equation (10'), the average pitch $\overline{Xp}$ calculated at step 137 is used.

When the angle θ thus obtained is larger than the predetermined allowable limit value δ, the inclination of the mark M with respect to the press (print inclination) is judged large, and the sequence is proceeded to steps 138, and 139, and 140 so as to skip the punching of the whole row. When the angle θ is smaller than the allowable limit value δ, the print inclination with respect to the press is judged small, and the operation is proceeded to the actual punching operation (step 157).

At step 158, positioning is started from the mark number N (refer to FIG. 15(b)). In this case, marks having the punch skip mark numbers memorized at steps 144 and 154 are not positioned, and the next mark is positioned. Then, whether or not the positioning is completed is judged (step 159). After the completion of positioning, a punching signal is output to the press (step 160). Then, the punching by the press is performed (step 161). At steps 158 to 161, the punching of the marks from k=N to k=1 is repeatedly performed.

When the punching operation of one row is completed in this fashion, judgement is made on whether or not the row number being currently punched is the last one or not at step 162. When the currently punched row is not the last one, the punching operation is shifted to the next row (step 163), and the sequence returns to the first sequence (refer to FIG. 15(c) and (d)). In FIGS. 15(c) and (d), the mark MJ which has been memorized as punching skip symbol indicates that the punching is not performed.

When the current row number is for the last row, the punching of the material sheet is completed, cut out refuse is disposed (step 163), a command to deliver a new material sheet to a destacker (not shown) is output (step 164), the sheet number is designated the row number is reset to 1 (step 165), and the operation returns to the first sequence.

In this manner, incomplete products due to punching error can be prevented.

Further, the row number R, the material sheet number C, and the code RJ indicating that the whole row should be skipped memorized at step 139 as well as the row number R, the material sheet number C, and the mark number K memorized in steps 144 and 154 may be displayed on a CRT display 93 in such manner as shown in FIG. 17, or those data may be printed out by a printer. Mark "*" in FIG. 17 is an RJ code indicating that the whole row should be skipped from punching.

Other causes of imperfect product may include such defects as printing error and scratches at the print part. In such cases, the operator of the press can input the mark number K of the affected print part through the operation panel 92 to store the data in the memory 54. Usually, the printing condition of the material sheet is visually checked for possible imperfection beforehand.

In this case, similar to the above-mentioned case, positioning with the mark number input by the operator is not performed. In this manner, imperfect punching can be prevented.

What is claimed is:

1. A method for feeding material sheet to a press comprising the steps of:
    transferring for predetermined travel distances a material sheet on which pairs, each consisting of a print part and a positioning mark located near said print part, are printed so that at each of said predetermined travel distances the positioning mark of a respective one of said pairs enters the field of view of a view means, said view means being situated at a certain fixed position related to the punching position of said press;
    detecting and storing, at each of said predetermined travel distances for the respective one of said pairs, a digital deviation value representative of the deviation of the center of said positioning mark from a reference position of said field of view in X axis and Y axis directions of said view means, so that when said material sheet has been transferred for all of said travel distances there will be stored a set of digital deviation values; and
    sequentially positioning each of said print parts to said punching position of the press using the set of detected and stored deviation values as respective positioning correction values.

2. A method for feeding material sheet to a press of claim 1 wherein a plurality of said pairs of print part and positioning mark are printed in matrix pattern.

3. A method for feeding material sheet to a press of claim 1 wherein said positioning mark is circular in form.

4. A method for feeding material sheet to a press of claim 1 wherein the transfer of said material sheet in the X and Y axis directions is performed by a clamper carrier capable of moving in the X and Y axis directions with one end of the material sheet clamped by a clamper of said clamper carrier.

5. A method for feeding material sheet to a press of claim 1 wherein said preset travel distances are determined by the print intervals; and of said positioning marks.

6. A method for feeding material sheet to a press of claim 1 wherein said reference position of the field of view is the center of said field of view.

7. A method for feeding material sheet to a press of claim 1 wherein the operation of said view means comprises the steps of performing main scan and sub scan in said field of view in the Y and X axis directions respectively, finding X coordinate of the center position of said mark from a sub scan position in which said mark is firstly detected and a sub scan position in which said mark is lastly detected, detecting the deviation of said mark in the X axis direction by the difference between the center position of the field of view and the X coordinate thus found, and detecting the deviation of said mark in the Y axis direction based on the difference between the distance from the upper limit of the field of view to the mark and the distance from the mark to the lower limit of the field of view in the main scan.

8. A method for feeding material sheet to a press of claim 1 wherein said view means moves vertically according to the thickness data indicating the thickness of the material sheet to focus on the surface of the material sheet.

9. A method for feeding material sheet to a press comprising the steps of:
    transferring for a certain travel distance a material sheet on which a plurality of pairs, each pair consisting of a print part and a positioning mark located near said print part, are printed so that said positioning marks sequentially enter the field of view of a view means provided in a position having a fixed relationship to the punching position of said press;
    detecting the deviation of the center of each of said positioning marks from a reference position of said field of view in X axis and Y axis directions of said view means; and
    positioning said print parts to said punching position of the press using the detected deviation values as positioning correction values;
    wherein said plurality of pairs are printed in a matrix pattern and said detecting of the deviation is carried out for the positioning marks in a row of said matrix while transferring said material sheet in the X axis direction, and said positioning is carried out from the last positioning mark in said row while transferring said material in the direction reverse to said detecting step.

10. A method for feeding material sheet to a press comprising steps of:
    transferring a material sheet on which a plurality of pairs, each consisting of a print part and a positioning mark located near said print part, are printed for a predetermined travel distance so that each of said positioning marks enter the field of view of a view means provided in a position related to the punching position of said press;
    detecting the center positions of said positioning marks in a row and detecting the deviation of each of said center positions of said positioning marks from a reference position of said field of view in X axis and Y axis directions of said view means;
    calculating the inclination of the print part from said deviation of each of the positioning marks;
    sequentially positioning said print parts in the row to said punching position of said press using said detected deviations as positioning correcting values; and
    skipping said step of sequentially positioning if said inclination exceeds a predetermined value.

11. A method for feeding material sheet to a press comprising steps of:
    transferring a material sheet on which a plurality of pairs, each consisting of a print part and a positioning mark located near said print part, are printed for a predetermined travel distance so that each of said positioning marks enter the field of view of a view means provided in a position related to the punching position of said press;

detecting the center positions of said positioning marks in a row and determining the deviation of each of said center positions from a reference position of said field of view in X axis and Y axis directions by said view means;

calculating from said detected center positions a first mean value representing the mean value of the Y coordinates and a second mean value representing the mean value of the distance in the X axis direction between two adjoining marks;

sequentially positioning said print parts to said punching position of said press, said positioning being carried out based on said deviations as correction values; and skipping said step of sequentially positioning if the difference betwen the Y coordinate of the center of a positioning mark corresponding to the print mark and said first means value exceeds a predetermined first limit value or the difference between said distance between adjoining marks and said second mean value exceeds a predetermined second limit value.

12. A method for feeding material sheet to a press comprising steps of:

detecting a defective print part on a material sheet on which a plurality of pairs, comprising a print part and a positioning mark located near said print part, are printed;

memorizing a mark number corresponding to said defective print part;

transferring said material sheet for a predetermined travel distance so that at least said positioning mark enters the field of view of a view means provided in a position related to the punching position of said press;

detecting deviation of the center of said positioning mark from a reference position of said field of view in X axis and Y axis directions by said view means; and skipping positioning of a print part corresponding to said memorized mark number to said punching position of the press based on said deviation value when the positioning is carried out.

13. In a method for feeding material sheet to a press, wherein said material sheet has a multiplicity of pairs printed thereon, each pair comprising a print part for press punching and a positioning mark located in the vicinity of said print part, and is fixed on a carrier, said carrier moving in the X and Y axis directions so as to feed said material sheet to the press, and there is provided view means for use in positioning each of said print parts to the working position of the press, the improvement comprising the steps of:

storing in advance X-Y coordinate data for each of said positioning marks representing the position of said carrier with respect to the X and Y axis directions, said data being determined in advance by the placement of said positioning mark and the amount for the material sheet to be transferred, which is determined by the distance between the working position of said press and the reference position of the field of view of said view means;

placing each of said positioning marks into the field of view of said view means based on the X-Y coordinate data of the positioning mark;

obtaining image data by forming image pick-up of said positioning marks by said view means;

detecting for each of said positioning marks the deviation amount of the center of said each positioning mark from the reference position of said field of view in the X and Y axis directions, and storing the resultant set of said detected deviation amounts;

correcting said X-Y coordinate data for each of the positioning marks based on the corresponding detected and stored deviation amounts; and sequentially positioning each of said print parts corresponding to the positioning marks to said working position of the press based on said corrected X-Y coordinate data for the positioning marks and said amount for the material sheet to be transferred, and determined by the working position of said press and the reference position for the field of view of said view means.

14. A method for feeding material sheet to a press as set out in claim 13 wherein said positioning mark is of a circular shape.

15. A method for feeding material sheet to a press as set out in claim 13 wherein said reference position of the field of view of said view means is the center of the field of view.

16. A method for feeding material sheet to a press as set out in claim 13 wherein said detecting of the deviation amount comprises the steps of:

detecting sub scanning positions of said image data when said each positioning mark is detected the first time and when said each positioning mark is detected the last time, said image data being obtained by main scanning in the X direction and sub scanning in the Y direction;

obtaining a deviation amount in the X axis direction by detecting the difference between the average of said scanning positions and the X coordinate of the center of said field of view; and obtaining a deviation amount in the Y axis direction by detecting the distance from the upper end of said field of view to said positioning mark and the distance from the point where scanning is apart from said each positioning mark to the lower end of said field of view and by calculating the difference between these distances.

17. In a method for feeding material sheet to a press wherein said material sheet has a multiplicity of pairs printed thereon, each pair comprising a print part for press punching and a positioning mark located in the vicinity of said print part, said material sheet is coupled to a carrier, said carrier moving in the X and Y axis directions so as to feed said material sheet to the press, and and there is provided view means for use in positioning each of said print parts to the working position of the press, the improvement comprising the steps of:

storing in advance X-Y coordinate data for each of said positioning marks representing the position of said carrier with respect to the X and Y axis direction, said data being determined from the placement of said positioning marks and the amount the material sheet is to be transferred, which is determined by the working position of said press and the reference position for a field of view of said view means, sequentially placing each of said positioning marks into the field of view of said view means based on the corresponding X-Y coordinate data of each positioning mark;

obtaining image data by performing image pick-up of each of said positioning marks by said view means;

sequentially detecting and storing the deviation amount of the center of each of said positioning marks in one row of said material sheet from the reference position of said field of view in the X and Y axis directions;

correcting said X-Y coordinate data for each of the positioning marks in said one row based on said detected and stored deviation amounts;

sequentially positioning each of said print parts for said one row to said working position of the press based on said corrected X-Y coordinate data for said positioning marks for said one row and said amount for the material sheet to be transferred as determined by the working position of said press and the reference position for a field of view of said view means; and sequentially executing the above steps with respect to each row of the print parts for press punching.

18. A method for feeding material sheet to a press as set out in claim 17 wherein said step of sequentially positioning each of the print parts for said one row to said working position of the press is performed beginning from the print part corresponding to the last positioning mark of said row and proceeds in the direction reverse to that of said step to sequentially placing.

19. A method for feeding material sheet to a press as set out in claim 17 which, after detecting said deviation amount of each of the positioning marks in said one row, further comprises the steps of:
calculating from said deviation amounts the inclination of printing on said material sheet with respect to said press; and
skipping the step of sequentially positioning each of said print parts to said working position when the calculated inclination of printing exceeds a predetermined value.

20. A method for feeding material sheet to a press as set out in claim 17 wherein, after detecting said deviation amounts of each of the positioning marks in said one row, further comprising the steps of:
calculating a first average value of said deviation amounts with respect to the X axis direction and a second average value of said deviation amounts with respect to the Y axis direction; and
during said step of sequentially positioning, skipping the positioning of individual ones of said print parts to said working position where, for that individual print part, the difference between said deviation amount of the corresponding positioning mark with respect to the X axis direction and said first average value exceeds a first predetermined value or where the difference between said deviation amount of the corresponding positioning mark with respect to the Y axis direction and said second average value exceeds a second predetermined value.

21. A method for feeding material sheet to a press as set out in claim 17 which further comprises the steps of:
storing in advance from an operation panel mark numbers of the positioning marks corresponding to defective print parts; and
during said step of sequentially positioning, skipping the positioning of individual ones of said print parts corresponding to the positioning marks having the stored mark numbers.

22. In a machine tool adapted to perform a work operation at a plurality of work positions along a row of a workpiece, each work position having associated with it on the workpiece a detectable positioning mark, each of said positioning marks being at a preset selectable offset distance from the associated work position, said workpiece being movable with respect to the location of said machine at which said operation is performed, said machine further including a detector for detecting said positioning marks, a system for controlling the positioning of said workpiece for performance of said work operations, comprising:
first positioning means for sequentially moving said workpiece along said row so that successive ones of said positioning marks are positioned within the field of said detector at locations at which alignment with a reference target is expected;
detection control means operative when said workpiece has been positioned at each expected alignment location, for detecting and storing any misalignment error between an expected alignment location and the actual position of said positioning mark detected by said detector, thereby to obtain a stored set of misalignment error values for the positioning marks in said row; and
second positioning means for moving said workpiece along said row sequentially to successive ones of said work positions, utilizing for the movement to each such position the misalignment error detected and stored for the corresponding work position by said detection control means, said work operation being performed by said machine at each such corrected position.

23. A system as set out in claim wherein said detection control means 22 further comprises comparative error detection means for carrying out the following operations:
storing the misalignment error for each positioning mark in a row,
determining an error value representative of the average error of the positioning marks in the row,
comparing the misalignment error of each said positioning mark in the row with said representative error value and determining if the difference between the error of said each positioning mark and the representative error value exceeds a predetermined amount, and
wherein said second positioning means includes means responsive to said comparative error detection means for excluding moving said workpiece to work positions correspondings to positioning marks having comparative error values exceeding said predetermined value.

24. A system for positioning a workpiece having one or more positioning marks printed on said workpiece, said marks being circular and having differing optical characteristics from said workpiece, comprising:
view means for optically scanning said workpiece along a line in a main scan direction in the field of view of said view means;
means for moving said workpiece in a sub-scanning direction which is generally perpendicular to said main scan direction so that said one or more positioning marks pass through the field of view of said view means;

control means for causing said view means to repetitively sequentially optical scan along said main scan direction while detecting the portions of said scan lines having differing optical characteristics;

means for establishing from the output of said viewing means digital position data corresponding to the center of said positioning marks, said means for establishing determines the center of each positioning mark in said subscan direction by determining when during said movement the corresponding positioning mark is first present in a sub-scan and when it is last present in a sub-scan, and means for positioning said workpiece to one or more desired working positions based on the determined position of the center of said one or more positioning marks.

25. A method for positioning a workpiece having one or more positioning marks printed thereon, comprising the steps of detecting the position offset error of each of said one or more positioning marks when said each mark is first moved to a detection position by means of numeral control, said offset error being obtained by line scanning of the mark by use of an optical sensor, said offset error being obtaining as a digital value representative of the offset position of the center of the mark, said digital values being stored, said digital offset values corresponding to the error of each of the detected positioning mark locations from the corresponding expected positioning mark locations; and sequentially positioning the workpiece to desired working positions using the set of stored digital offset error values for correction of said positioning.

* * * * *